(12) United States Patent
Stanger et al.

(10) Patent No.: US 7,948,558 B2
(45) Date of Patent: May 24, 2011

(54) AUDIO VIDEO TIMING MEASUREMENT AND SYNCHRONIZATION

(75) Inventors: Leon J. Stanger, Farmington, UT (US); James A. Michener, Grass Valley, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1230 days.

(21) Appl. No.: 11/529,941

(22) Filed: Sep. 29, 2006

(65) Prior Publication Data

US 2008/0079851 A1 Apr. 3, 2008

(51) Int. Cl.
*H04N 9/475* (2006.01)
(52) U.S. Cl. .......................... 348/515; 348/512; 348/484
(58) Field of Classification Search ................... 348/512, 348/515, 518, 519, 473, 476, 478, 192, 180, 348/571, 578, 632, 633, 722, 423, 462, 480–485
See application file for complete search history.

(56) References Cited

U.S. PATENT DOCUMENTS

| | | | |
|---|---|---|---|
| 4,099,202 A | 7/1978 | Cavanaugh | |
| 4,218,705 A | 8/1980 | Inaba et al. | |
| 4,313,135 A | 1/1982 | Cooper | |
| 4,618,890 A | 10/1986 | Kouyama et al. | |
| 4,703,355 A | 10/1987 | Cooper | |
| 4,743,981 A | 5/1988 | Spencer et al. | |
| 4,851,909 A | 7/1989 | Noske et al. | |
| 4,963,967 A | 10/1990 | Orland et al. | |
| 4,969,041 A | 11/1990 | O'Grady et al. | |
| RE33,535 E | 2/1991 | Cooper | |
| 5,091,947 A | 2/1992 | Ariyoshi et al. | |
| 5,243,424 A | 9/1993 | Emmett | |
| 5,365,579 A | 11/1994 | Hendrickson | |
| 5,572,261 A | 11/1996 | Cooper | |
| 5,642,171 A | 6/1997 | Baumgartner et al. | |
| 5,751,368 A | 5/1998 | Cooper | |
| 5,818,520 A | 10/1998 | Janko et al. | |
| 5,880,788 A | 3/1999 | Bregler | |
| 6,097,558 A | 8/2000 | Oguro | |
| 6,233,389 B1 | 5/2001 | Barton et al. | |
| 6,246,439 B1 | 6/2001 | Zink et al. | |
| 6,269,122 B1 | 7/2001 | Prasad et al. | |
| 6,330,033 B1 | 12/2001 | Cooper | |
| 6,373,960 B1 | 4/2002 | Conover et al. | |
| 6,407,769 B1 * | 6/2002 | Emmett | 348/180 |
| 6,414,960 B1 | 7/2002 | Kuhn et al. | |
| 6,480,902 B1 | 11/2002 | Yuang et al. | |
| 6,697,120 B1 | 2/2004 | Haisma et al. | |
| 6,757,300 B1 | 6/2004 | Pages et al. | |
| 6,836,295 B1 | 12/2004 | Cooper | |
| 6,906,755 B2 | 6/2005 | Lundblad et al. | |

(Continued)

OTHER PUBLICATIONS

Robin, Michael et al.; "Digital Television Fundamentals—Design and Installation of Video and Audio Systems"; McGraw-Hill; Chapter 8; title page and pp. 345-425.

(Continued)

*Primary Examiner* — M. Lee (57) ABSTRACT

A method and apparatus for synchronizing audio and video portions of a media program signal is disclosed. In a transmitting embodiment, the method comprises the steps of identifying a video event according to an video event discriminant in the video signal, and inserting a timing signal into the audio signal, and the apparatus comprises a video analysis module for identifying a video event according to an video event discriminant in the video signal, a timing signal generator for generating a timing signal, and a mixer for inserting the timing signal into the audio signal.

56 Claims, 6 Drawing Sheets

U.S. PATENT DOCUMENTS

| | | |
|---|---|---|
| 6,912,010 B2 | 6/2005 | Baker et al. |
| 6,961,512 B1 | 11/2005 | Cho |
| 7,020,894 B1 | 3/2006 | Godwin et al. |
| 7,030,930 B2 | 4/2006 | Kovacevic |
| 7,043,749 B1 | 5/2006 | Davies |
| 7,593,061 B2 * | 9/2009 | Baumgartner ................ 348/515 |
| 7,692,724 B2 * | 4/2010 | Arora et al. .................. 348/515 |
| 2002/0140857 A1 | 10/2002 | Limaye |
| 2002/0140859 A1 | 10/2002 | Kariatsumari |
| 2003/0122964 A1 | 7/2003 | Hara |
| 2003/0142232 A1 | 7/2003 | Albean |
| 2004/0179043 A1 | 9/2004 | Viellescaze et al. |
| 2004/0227856 A1 | 11/2004 | Cooper |
| 2005/0238059 A1 | 10/2005 | Lundblad et al. |
| 2006/0007356 A1 | 1/2006 | Junkersfeld et al. |

OTHER PUBLICATIONS

Notice of Allowance dated Jan. 26, 2011 in U.S. Appl. No. 11/784,758 filed Apr. 7, 2007 by Leon J. Stanger.

* cited by examiner

AUDIO VIDEO TIMING MEASUREMENT AND SYNCHRONIZATION

CROSS-REFERENCE TO RELATED APPLICATIONS

This application is related to U.S. patent application Ser. No. 10/654,836, entitled "METHOD AND APPARATUS FOR LIPSYNC MEASUREMENT AND CORRECTION," by Leon J Stanger, filed Sep. 4, 2003, which application claims benefit of U.S. Provisional Patent Application No. 60/409,346 entitled "METHOD AND APPARATUS FOR LIPSYNC MEASUREMENT AND CORRECTION," by Leon J Stanger, filed Sep. 9, 2002, both of which applications are hereby incorporated by reference herein.

BACKGROUND OF THE INVENTION

1. Field of the Invention

The present invention relates to systems and methods for transmitting data, and in particular to a system and method for measuring and correcting for audio to video synchronization errors.

2. Description of the Related Art

In presenting media programs such as films and television programs, it is important that the video portion of the program and the audio portion of the program be adequately synchronized. Timing differences between the audio and video portions of a media program can be caused by digital signal processing devices with unequal or separate audio and video time delays. Typically, video processing takes longer than audio processing, and the video signal is delayed from the audio signal. Such errors are most noticeable as lip synchronization ("lipsync") errors when the media program displays someone speaking. Timing differences may occur in the production and distribution of programming during: initial production and mixing, editing and special effects, frame synchronization, compression for storage or transmission, and audio/video display or presentation. There are typically multiple problems and errors that may accumulate as a media program passes through different stages in the distribution chain. Added together, such errors can be objectionable to the viewer.

Many synchronization problems can be easily remedied by adjusting the delay of the audio signal or the video signal at a number of points in the distribution chain, if the error is known. Frame synchronizers, such as those disclosed in U.S. Pat. No. 4,218,705 are but one example of devices for making such adjustments. Still other equipment can perform out-of-service timing measurements, but when the equipment is placed in service to make in-service measurements during regular programming, timing errors are difficult to measure. In most cases, human operators must determine by observation if the synchronization between the audio and the video components of the media program is correct. It is difficult to determine the magnitude or direction (early or late) of lipsync error, and if a synchronization problem has been identified, it is difficult to determine which of the elements in the distribution chain is the source of the unacceptable error.

Many methods have been used to synchronize the audio and video of media programs. The earliest known method was the clapboard used in film productions, which allowed film producers to align the timing of the frame where the clapboard closed with the sound on the audio track. This sort of synchronization test is known as an out-of-service test. More sophisticated out-of-service equipment is in current use, including the VM700 test set available from the TEK-TRONIX corporation, which measures timing errors between special test signals applied to the audio and video signal paths.

Other systems have attempted to address the synchronization issue. For example, TEKTRONIX also developed a system (the AVDC100) for in-service timing measurements. The AVDC 100 would make such measurements by carrying a replica of the audio signal in the active portion of the video signal in the form of a watermark. While effective, this approach was held proprietary and was not widely adopted, and the watermarking process lowers the signal to noise ratio (SNR) of the video and makes the video signal difficult to compress in MPEG systems, which causes a waste of precious bandwidth.

Other systems have been devised. For example, U.S. Pat. No. 6,836,295 discloses the use of audio events to mark video. However, this technique requires additional bandwidth or degradation of the video signal, and is not compatible across all television and film formats. This patent also refers to U.S. Pat. No. 4,703,355, and indicates that this patent discloses the addition of adding an audio signal for timing purposes. However, to assist with the problem of losing the timing signal, this patent discloses that the added signal is continuous, thus again requiring additional bandwidth and potentially compromising the original audio signal.

U.S. Pat. No. 5,243,424 discloses a system that detects "vision cuts" in a video signal, and after a known delay, adds a marking signal to the audio channel. However, this system relies on attenuation of the marking signal to below that of the audio portion of the media program, and this is not practical in many applications. This system is also incapable of precise synchronization, because no means is disclosed for determining the precise timing of the tone burst. U.S. Pat. No. 4,963,967 discloses a system that generates a video test field and a pulse every N number of frames, and applies that pulse to add a distinctive video signal and an audio tone. This system is more complex than necessary, and adds information to both the video and audio signals, wasting bandwidth and unnecessarily increasing complexity.

What is needed is a simple, yet effective method and system for synchronizing the video and audio portions of media programs. What is further needed is that this system be suitable for conversion between all television and film formats and be suitable for use with both audio and video compression techniques, while not requiring any additional bandwidth. The present invention satisfies that need.

SUMMARY OF THE INVENTION

To address the requirements described above, the present invention discloses a method and apparatus for synchronizing audio and video portions of a media program signal by identifying naturally occurring timing points within the video program and marking the timing relationship to the audio program using a timing signal. After the media program has been marked, it is transmitted to a receiver, where the timing signal is detected and used to synchronize the video signal.

In a transmitting embodiment, the method comprises the steps of identifying a video event according to an video event discriminant in the video signal, and inserting a timing signal into the audio signal, and the apparatus comprises a video analysis module for identifying a video event according to an video event discriminant in the video signal, a timing signal generator for generating a timing signal, and a mixer for inserting the timing signal into the audio signal of the identified video event. The apparatus comprises a video analysis module for identifying a video event according to an video event discriminant in the video signal, a timing signal generator for generating a timing signal, and a mixer for inserting the timing signal into the audio signal of the identified video event.

In a receiving embodiment, the method comprises the steps of receiving the video signal and the audio signal, the audio signal having a timing signal indicating a time of an identified video event in the video signal, detecting the video event in the received video signal, detecting the timing signal in the received audio signal, and synchronizing the video signal with the audio signal using the detected timing signal and the detected video event. The apparatus comprises a receiver for receiving the video signal and the audio signal, the audio signal having a timing signal, a video event detector, for detecting a video event in the received video signal, a synchronization detector, for detecting the timing signal, and a synchronizer for synchronizing the video signal with the audio signal using the detected timing signal and the detected video event.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
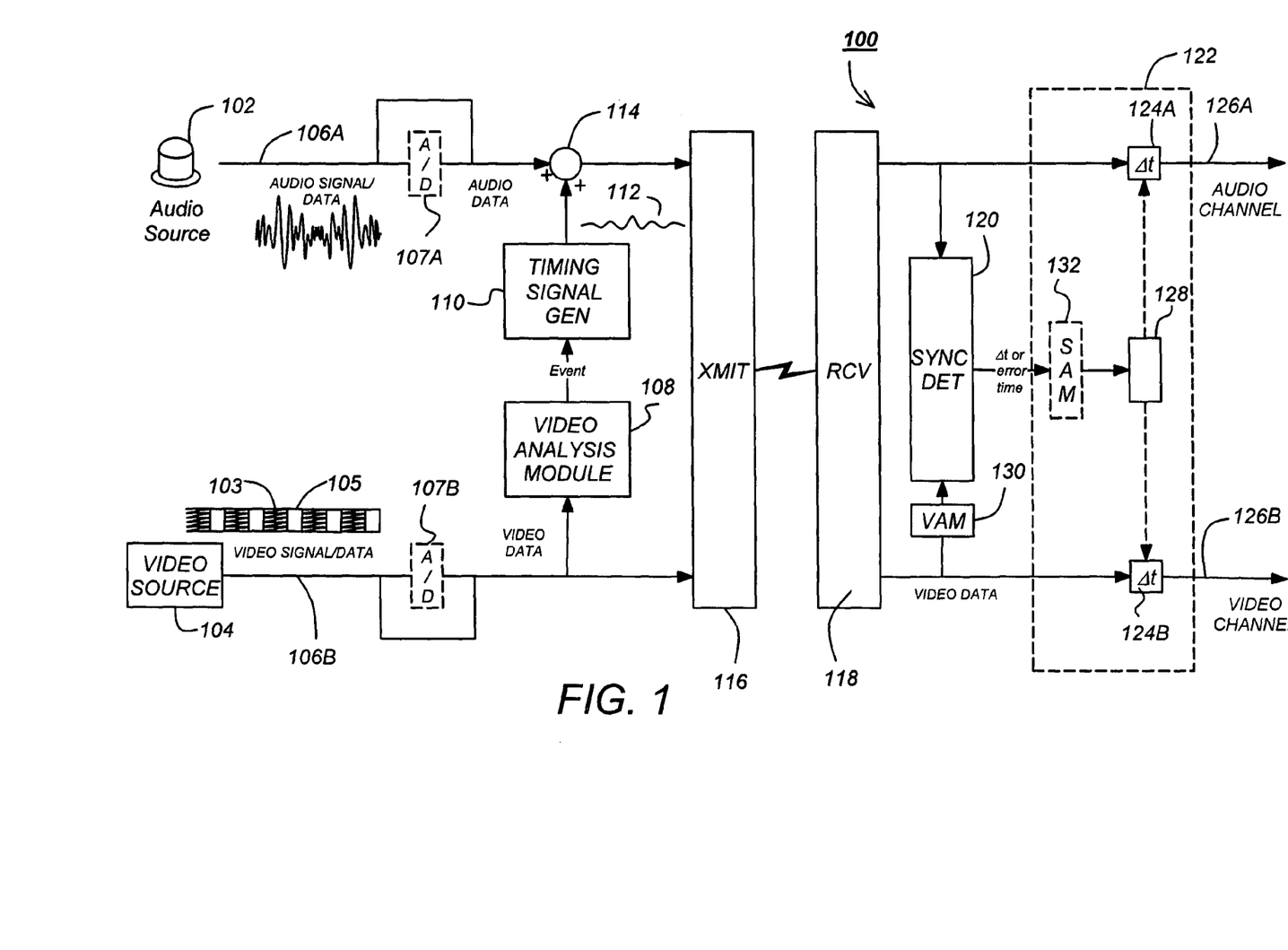
FIG. 1 is a diagram depicting a media distribution system.

FIG. 1 is a diagram depicting a media distribution system 100 employing one embodiment of the present invention. A media program signal 106 comprising an audio portion or signal 106A and a video portion or signal 106B is provided. The audio signal 106A is provided by an audio source 102 such as a microphone, and the video signal 106B is provided by a video source 104.

The video signal 106B of the media program signal 106 may include video segments 103 having picture information such as video frames and non-video segments 105. The non-video segments 105 include, for example, the closed captioning information in line 21 of the media program signal, information in the vertical blanking interval (VBI), and/or other information.

The present invention can be implemented using analog signals or digital data. FIG. 1 illustrates that the audio signal 106A and the video signal 106B may be in analog or digital form. If in analog form, the audio and video signals 106A, 106B may be passed through an analog-to-digital (A/D) converters 107A and 107B and thereafter digitally processed. Alternatively, the audio and video signals 106A, 106B may remain in analog form, and with further processing performed in the analog domain.

The video signal/data 106B (hereinafter video signal 106B) is provided to a video analysis module (VAM) 108. The video analysis module identifies video events occurring in the video signal at time t. The video event can be defined by one or more video event discriminants. In one embodiment, the discriminant is a change in the luminance of all or a portion of the video signal from one frame to another frame (typically, the next frame), a temporal change in color between a portion of a video frame, or by determining a correlation (or lack of correlation) between corresponding data between a first frame and a second frame.

The video analysis module 108 provides an indication that a video event has occurred to the timing signal generator (TSG) 110. The TSG 110 accepts the event indication from the VAM 108 and generates a timing signal 112 in response thereto. In one embodiment, the amplitude of the pulse generated by the TSG 110 varies with the amplitude of the original audio signal. Preferably, the (average) amplitude of the pulse is approximately 10-20 dB lower than the amplitude of the original audio signal. In embodiments in which the VAM 108 can identify different event types and provides an indicia of the event type to the TSG 110, the TSG 110 generates a timing signal having the characteristics associated with the video event type.

The timing signal 112 is provided to a mixer 114, which adds the timing signal 112 to the audio signal 106A to create an augmented audio signal. The composite audio signal and the video signal is then transmitted by the transmitter 116, and received by receiver 118.

The augmented audio signal is provided to a synchronization detector 120, which detects the timing signal. The video signal is provided to a second video analysis module 130 having a functionality complementary to that of the first video analysis module 108 (that is, the second video analysis module 130, like the first video analysis module 108 accepts video data and identifies video events). The video events are provided to the synchronization detector 120.

The synchronization detector 120 uses the video events from the second video analysis module and the detected timing signals to generate a measurement of the synchronization error, or Δt, which is provided to the synchronizer 122. In embodiments where the audio pulse is to be removed from the audio track (see below), the synchronization detector 120 also determines the amplitude of the pulse. The synchronizer 122 then delays the audio and/or video signals in accordance with the determined synchronization error as required to synchronize the audio and video signals.

In the illustrated embodiment, the synchronizer 122 comprises a synchronization controller 128 and delay elements 124A and 124B. For systems in which lipsync errors are due to video channel delays (often the case, since video processing is typically more computationally intensive than audio processing), the synchronizer 122 need have only one delay element 124A to delay the audio signal the appropriate amount. For systems in which the lipsync errors are due to audio channel delays alone, the synchronizer 122 need have only one delay element 124B to delay the video signal the appropriate amount. For systems in which the lipsync errors may be due to audio and video channel delays, the synchronizer comprises two delay elements 124A and 124B so that either channel may be delayed the appropriate amount. The delays implemented by delay elements 124A and 124B can also be used to account for any processing delays in generating, detecting, analyzing and/or using the timing signal.

The synchronizer 122 may also comprise a statistical analysis module (SAM) 132. The SAM 132 collects information regarding the synchronization errors detected from the synchronization detector 120, and uses this information to increase the accuracy or efficiency of the synchronizer. In one embodiment, the SAM 132 is programmed to correct for synchronization errors only when a sufficient number consecutive measurements of Δt have been provided by the synchronization detector 120. For example, if the estimated synchronization error measurements taken about 15 seconds apart were 0.1 seconds, 0.5 seconds, and 0.1 seconds, the SAM 132 may be programmed to reject the measurements and command the synchronization controller 128 to do nothing, but if the estimated synchronization error measurements taken during another time about 15 seconds apart were 0.1, 0.2 and 0.1 seconds, the synchronization controller may be programmed to implement a suitable delay. That suitable delay could be 0.1 second (disregarding the 0.2 second data point), 0.13 second (averaging the data points), or a weighted average.

Figure 2:
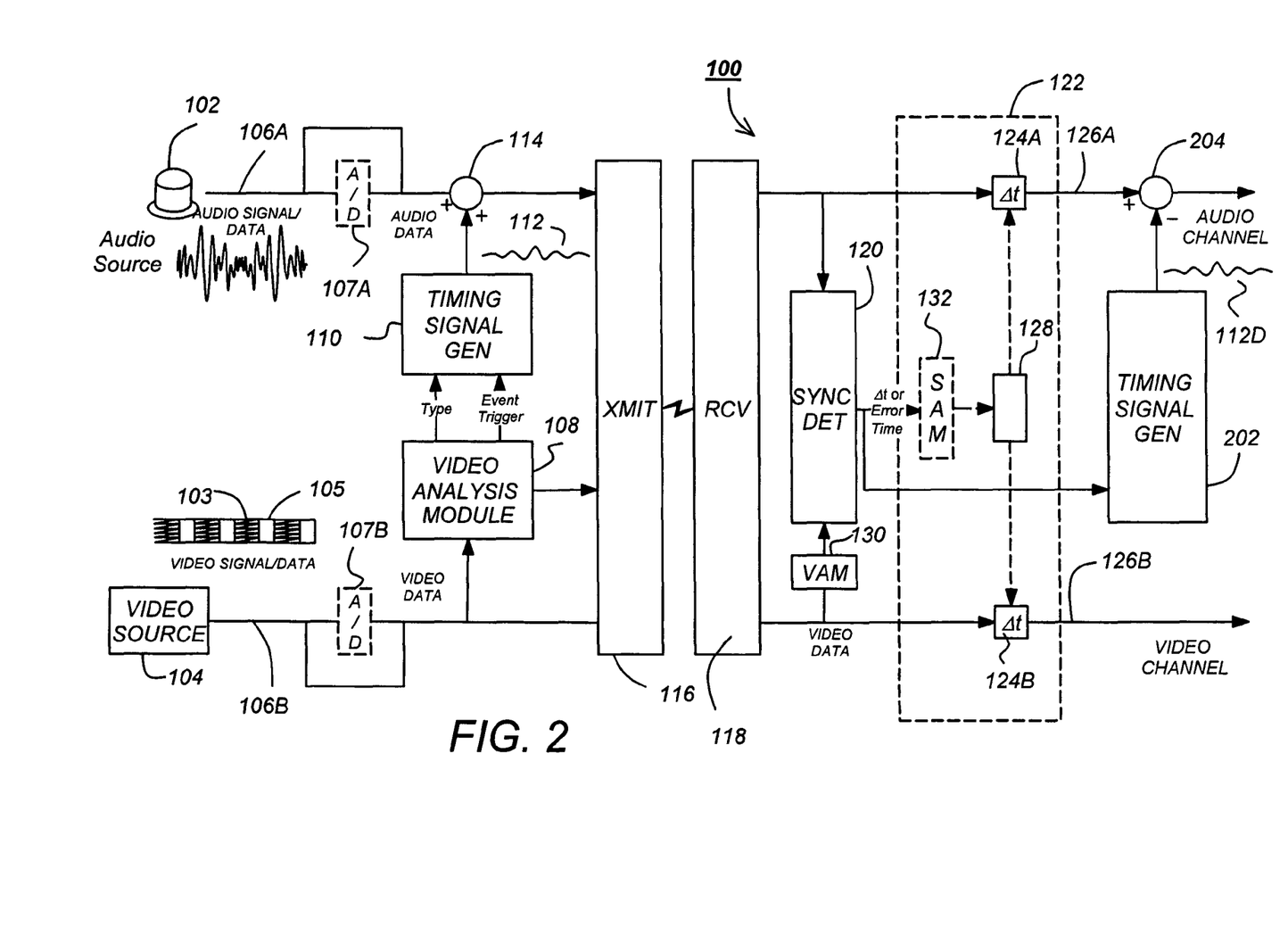
FIG. 2 is a diagram illustrating an embodiment of the media distribution system in which the timing signal is removed from the audio channel after it has been used for synchronization purposes.

FIG. 2 is a diagram illustrating an embodiment of the media distribution system 100 in which the timing signal 112 is removed from the audio channel after it has been used for synchronization purpose and before the media program is displayed or otherwise presented to the user. FIG. 2 also illustrates a system in which the VAM 108 also provides some indicia of the type of the video event that was detected to the TSG 110. For example, if the discriminant was a scene change and a scene change event is detected, the VAM 108 may provide a pulse or other command to the TSG 110 at the time of the scene change, as well as information (perhaps in the form of one or more bits) to the TSG 110 to indicate that the video event that was detected was a scene change. The TSG 110 can use this information to generate different timing signals 112, each associated with one of the different video events. The different timing signals are distinguishable from one another by the synchronization detector 120, thus allowing the type of video event that triggered the generation of the timing signal to be recovered downstream and used for a variety of purposes. This allows use of one or more of a group of video discriminators, each having an associated timing signal. In embodiments in which the timing signal is a low frequency sinusoidal pulse, different video discriminators can be associated with pulses of different fundamental frequencies. For example, pulses of 16, 18, 20, 22, and 24 Hz can be associated with different video discriminators.

This information can be used to subtract the timing signal from the audio channel. In the embodiment shown in FIG. 2, the sync detector 120 not only detects the presence of the timing signal 112, but also analyzes the timing signal 112 and the video data to determine which kind of video event triggered the generation of the timing signal. This information can be used to more accurately determine the synchronization error or to generate a duplicate timing signal 112D (using a second timing signal generator 202) that can be subtracted from audio signal by subtractor 204. This effectively eliminates the timing signal 112 from the audio stream, thus rendering it either inaudible or at least, substantially reducing its audibility.

Figure 3:
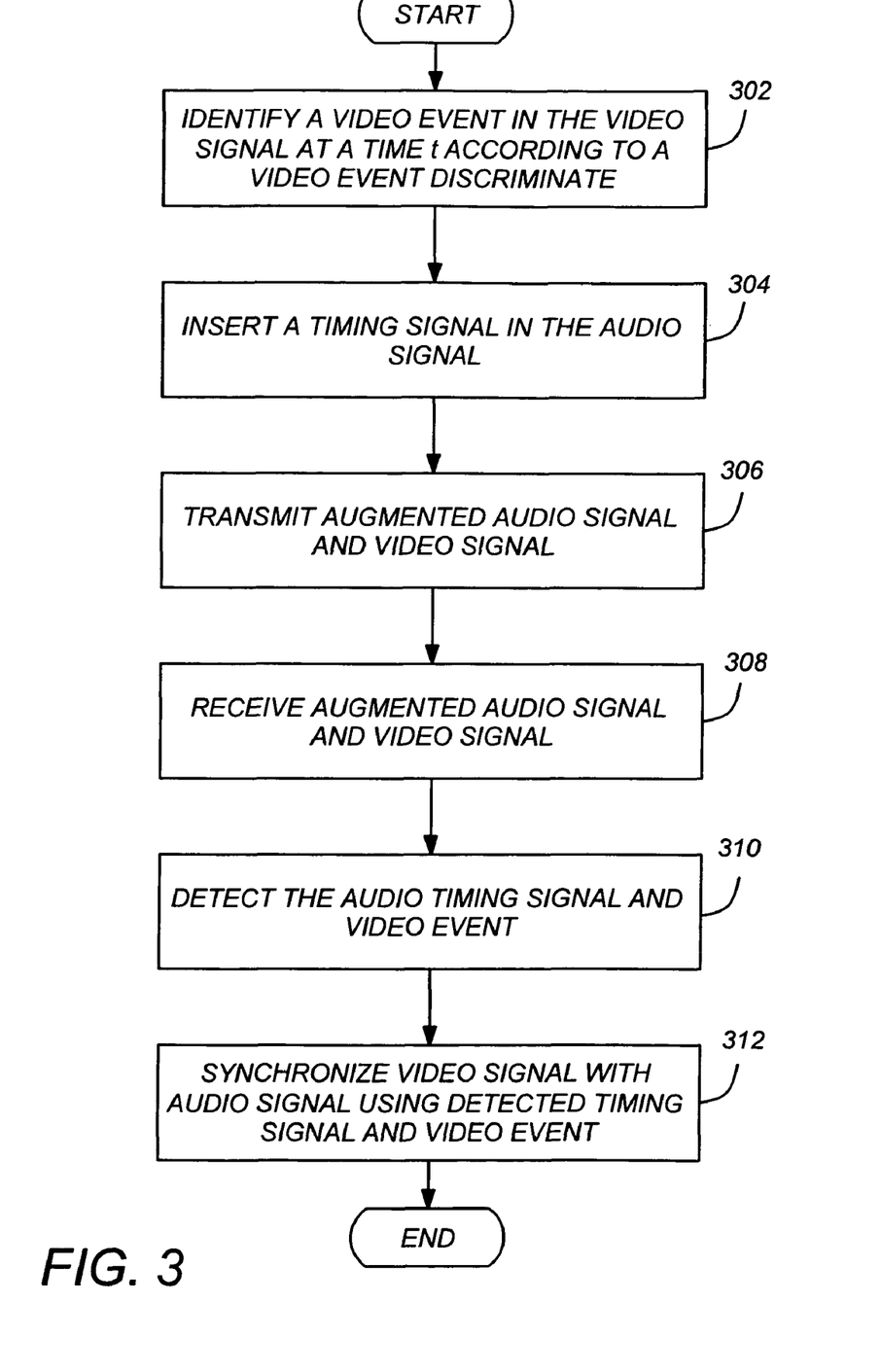
FIG. 3 is a diagram presenting a flow chart illustrating an exemplary technique for inserting and recovering synchronization information.

FIG. 3 is a diagram presenting a flow chart illustrating an exemplary technique for inserting and recovering synchronization information. A video signal is provided to the VAM 108. The video signal has at least one video event characterized by video event discriminant that takes place at time t. In block 302, the video signal is analyzed and compared to the one or more video event discriminants to identify the video event(s).

Figure 4A:
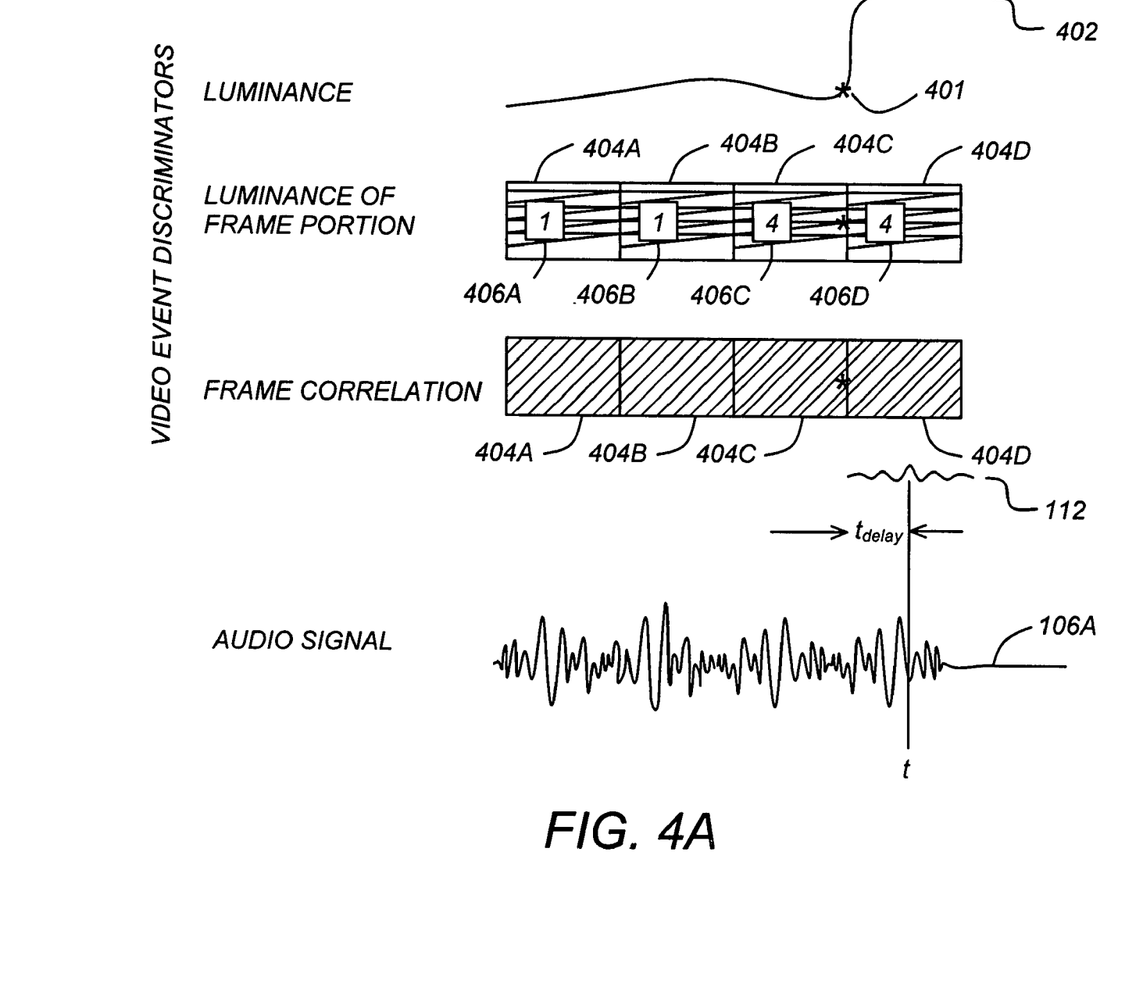
FIG. 4A is a diagram illustrating exemplary video event discriminators and video events.

FIG. 4 is a diagram illustrating exemplary video event discriminators and video events. One possible video event discriminator is the magnitude of the luminance signal 402. FIG. 4 shows that a VAM 108 identifies video event 401 (indicated by the asterisk "*") at time t when there is a temporal change in the luminance signal 402 (in the illustrated case, a rapid increase). FIG. 4 also shows an embodiment in which video signal 106B is characterized by a plurality of frames 404 (comprising frames 404A-404D), and the video event 401 is defined as a change in the luminance of a portion 406 of the frames 404. For example, in the illustrated example, the measured luminance of portion 406 of the frame 404 changes from a value of "1" to a "4" between frame 404B and 404C, thus indicating that a video event 401 has occurred.

Note that in embodiments where the timing signal 112 is in the form of a $$\frac{\sin x}{x}$$

(or sin c(x)) pulse, the peak of the pulse occurs at a time $t_{delay}$ after the video event 401 has been identified. This time delay must be accounted for in determining the synchronization error. Note also that for purposes of illustration, the time base of the frames 404A-404D and the audio pulse 112 are not shown to scale. Each video frame is approximately 1/30 of a second in length, while the audio pulse 112 is in the order of approximately 1/2 of a second. Hence, the width of the audio pulse (and the temporal length of $t_{delay}$ in comparison to the temporal frame length of the video frames) is longer than shown.

Video event discriminators can be identified for different portions of the video frame as well. For example, since visible watermarks or "bugs" are often inserted by media program providers in the lower right hand corner of the frame, this portion of the video frame can be examined to identify video events 401. For example, a persistent image in this portion of the video frame can be identified as a bug, and when that bug disappears, this may be an indication that the media program is being interrupted by a commercial or a change in programming. This may be used as a discriminant for a video event 401. Video events 401 can also be defined using a combination of different discriminants in different portions of the frame. For example, if it is desired to catch scene changes as video events 401 instead of or in addition to program breaks, it would be advisable to avoid frame data in the vicinity of the "bug", as this area may have a "bug" that changes little if at all, even during scene changes. In the illustrated example, the video event 401 is defined to have occurred at the end of the frame, but the video event 401 could have also been defined to be at the beginning of the frame, the beginning of the next frame, when the scanning of the portion 406 of the frame 404 in question is completed, or in the temporal center of the affected frame.

FIG. 4 also shows the application of another possible video event discriminant. In this case, each frame of the video signal is analyzed to determine a frame-to-frame correlation. When the correlation between frames falls below a particular value, the video event 401 is identified. In the illustrated example, this occurs in frame 404C. Again, the end of the frame was arbitrarily chosen as the time at which the video event 401 was identified. Another possible video event discriminant is a temporal change in color in a portion of a frame 404 (for example, from sky-blue to brown).

In any of the above cases, after the video event 401 has been identified, the audio signal 106A is augmented with a timing signal 112. Typically, the audio pulse 112 is inserted at a defined time after the occurrence of the video event 401. This is the case for at least two reasons.

First, the identification of the video event cannot occur instantaneously, as this process requires the completion of a processing algorithm or equivalent. In cases where the time required for such processing is significant enough to include noticeable timing errors, the delay for such processing must be accounted for when synchronizing the audio and video content. In one embodiment, this is accomplished by inserting the timing signal in the audio signal at a defined time that is offset from the video event. For example, if the processing were to take up to 0.05 seconds, the timing signal could be inserted into the audio signal 0.05 seconds in all cases, and the true time of the video event determined by the receiver by subtracting the 0.05 seconds from the time that the audio event is identified. This time can also be used to account for processing times required to identify and process the timing signal by the receiver.

Second, some embodiments of the invention, the timing signal begins before it can be easily measured. For example, in one of the embodiments described below, the timing signal is in the form of a sin c pulse and the timing signal determined as the peak of the pulse. The audio pulse 112 must begin before the peak of the audio pulse by a time $t_{delay}$, which is a function of the fundamental frequency of the pulse 112 and the windowing used to create it. Since the peak occurs at a time after the pulse begins, this delay must be accounted for. This can be accomplished by inserting the timing signal at a determined time that is offset from the video event. Similar techniques are required to implement embodiments that use the differential sin c pulse for the timing signal, as described below.

Note also that scene changes that occur faster than a pulse length cannot be adequately represented by the pulse, and should be ignored or processed with an audio signal with a suitably short pulse width. For example, if the audio signal is removed from the audio channel before providing it to be reproduced during viewing, a shorter (and hence, higher frequency and audible) pulse length can be used.

Returning to FIG. 3, block 302 illustrates the insertion of a timing signal into the audio signal at a time corresponding to the identified video event 401. The timing signal is provided by the timing signal generator 110. The timing signal may be generated in a number of ways, and may take a variety of forms. In one embodiment, the timing signal is a digital signal that is simply recalled from a storage. In another embodiment, the timing signal is an analog or digital signal that is generated each time it is required.

Since it is desirable to have the timing signal as inaudible as possible, it is beneficial to restrict the spectral content of the sinusoidal pulse to lower frequencies (16-24 Hz). To achieve this result, the sinusoidal pulse may take the form of a sin c($\omega t$) (or $$\frac{\sin(\omega t)}{\omega t}$$

) pulse (where $\omega$ is the fundamental frequency of the pulse) rather than a simple sinusoid.

It is desirable to use the timing signal 112 to reflect the relationship between the timing of the audio signal and the video signal as accurately possible, and this is best accomplished by marking the timing signal at a zero crossing rather than a peak value. At the same time, it is undesirable for the audio signal to include energy with significant very low frequency components (e.g. at or near DC or zero frequency). That is because few audio transmission/reproduction systems are capable of transmitting or reproducing such DC energy, as they use series-coupled capacitors that block DC energy.

The desire for increased accuracy and decreased very low frequency energy can be accomplished by using a timing signal of the form of the derivative of the sin c($\omega t$) pulse, which is defined as:

$$\frac{\cos(\omega t)}{\omega t} - \frac{\sin(\omega t)}{(\omega t)^2},$$

wherein $\omega$ is the selected fundamental frequency of the timing signal, which is preferably between 16 and 24 Hz.

Figure 4B:
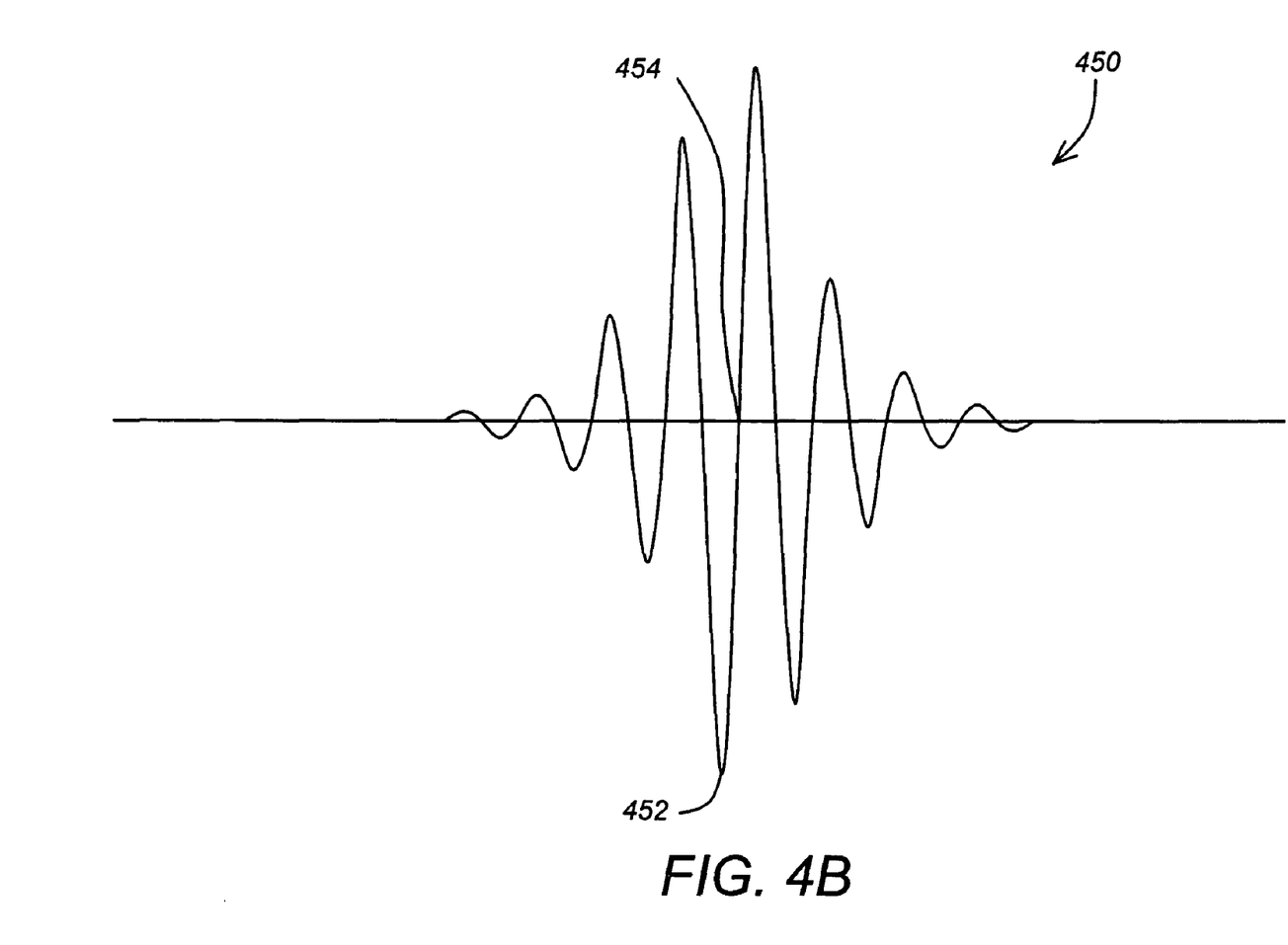
FIG. 4B is a diagram illustrating a differential pulse used in selected embodiments.

FIG. 4B is a diagram showing a typical differential sin c pulse 450. The differential sin c pulse 450 comprises a zero crossing 454 and an amplitude peak 452 adjacent thereto. The spectral energy of the foregoing pulse is much like that of the sin c($\omega t$) pulse, in that above a given cutoff frequency, there is zero energy. However, unlike the sin c($\omega t$) pulse, the energy in the derivative of the sin c($\omega t$) pulse drops off at 6 dB per octave below the cutoff frequency, and it has no DC components. Also, the "peak" of its energy occurs with a rapid transition through zero, making the peak easily detectable as a sign change adjacent one of the amplitude peaks or a sign change adjacent an energy peak.

The differential sin c($\omega t$) pulse still has the disadvantage of requiring an infinitely long time to send the pulse. This can be remedied through the application of a window function to the sin c($\omega t$) pulse. A wide variety of window functions can be used, including rectangular, Gauss, Hamming, Hann, Bartlett, triangular, Bartlett-Hann, Blackman, Kaiser, Nuttall, Blackman-Nutall, Flat top, Bessel or Sine windows (see, for example, the windowing functions described in Wikipedia (http://en.wikipedia.org/wiki/Window_function#Hann_window) incorporated by reference herein. The raised cosine or Hann window function:

$$\omega(n) = 0.5\left(1 - \cos\left(\frac{2\pi n}{N-1}\right)\right)$$

wherein N represents the width, in samples of a discrete-time window function, and n is an integer, with values $0 \leq n \leq N-1$.

The pulse frequency and windowing function may be adjusted as desired to maximize detection while minimizing audibility. As the pulse frequency increase, the time over which the windowing function needs to be applied also increases.

The pulse can be of any suitable length, but must be long enough to be adequately detectable with sufficient accuracy by the synchronization detector 120, yet short enough to allow use of the timing signal to correct errors without undue delay. In one embodiment, the pulse is between 100 milliseconds and 5 seconds in length.

In another embodiment, the audibility of the timing signal is reduced by applying a combination of sub-timing signals such that the sum of the sub-timing signals is zero. For example, if the audio channel includes separate left and right channels, a left timing signal can be used along with a complimentary right timing signal having the same amplitude but opposite phase of the left timing signal. Since the sum of the left and right channel signals is zero, and because low frequencies are typically not directional, the timing signal will be essentially inaudible to the user. The timing signal will also be inaudible in installations using satellite speaker and subwoofer technology because the lower frequencies are typically mixed down to monaural before being applied to the subwoofer. Also, the very low frequencies found in media programs are typically recorded in both the right and left channels in phase. Since the right and left channel information of the timing signal is recorded out of phase, to cancel each other out, detection of the timing signal itself may be simplified. Surround sound systems comprising more than two channels can have timing signals of appropriate phase and amplitude applied to the various channels such that when summed to LT RT (left total, right total), then again to monaural, the timing signal will become inaudible.

Returning again to FIG. 3, the augmented audio signal and video signal is transmitted by transmitter 116, as shown in block 306. The augmented audio signal and the video signal are received by the receiver 118, as shown in block 308. The video event 401 is identified in the received video signal and compared to a timing signal 112 detected in the augmented audio signal as shown in block 310, and these detected signals are used to synchronize the video signal, as shown in block 312.

Figure 5A:
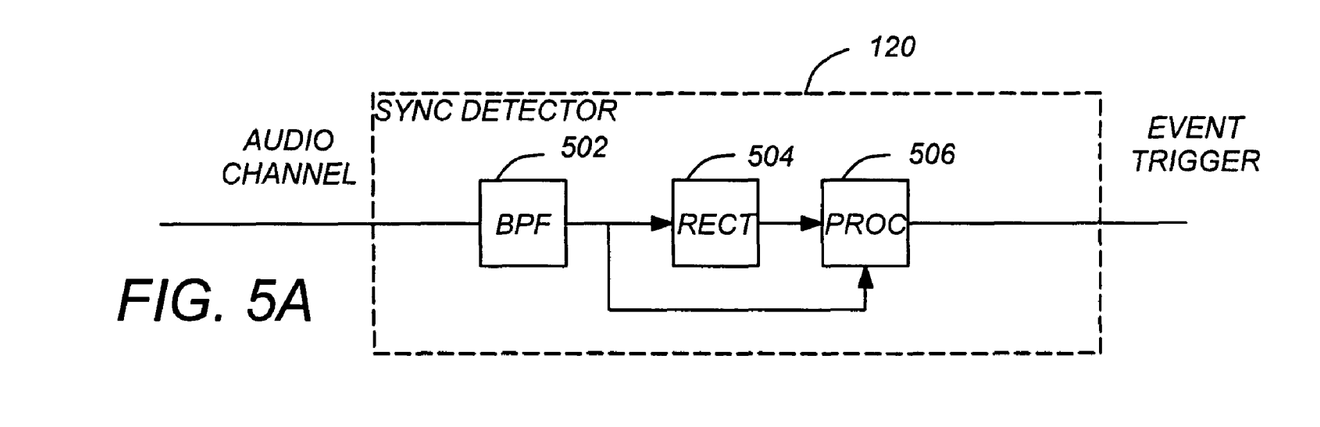
FIGS. 5A and 5B are diagrams illustrating two methods by which the timing signal 112 can be detected and extracted.
Figure 5B:
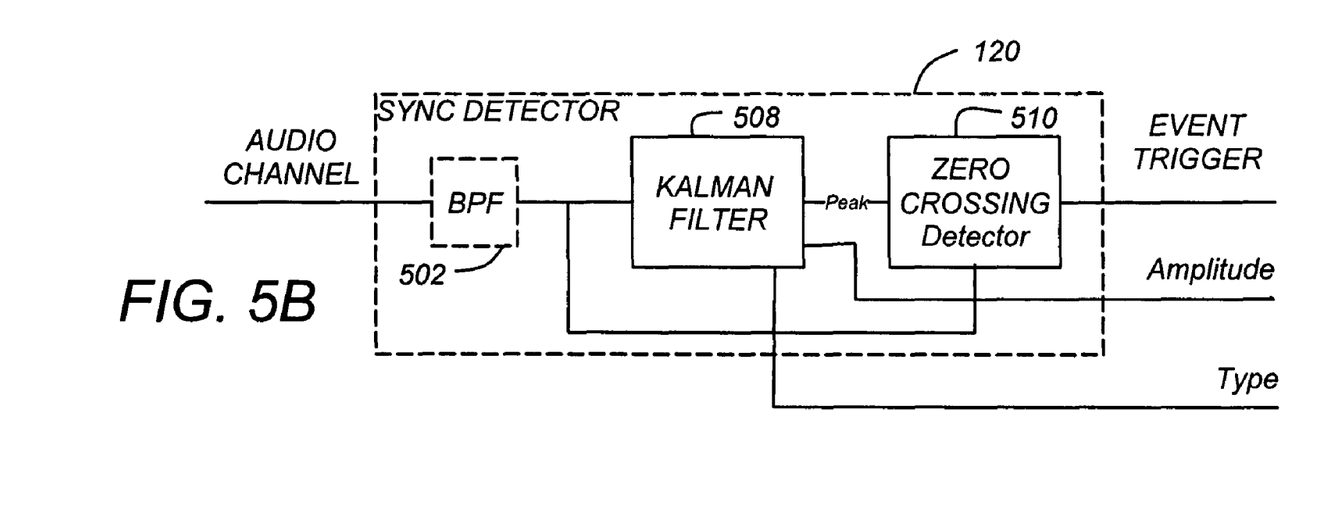

FIGS. 5A and 5B are diagrams illustrating two methods by which the timing signal 112 can be detected and extracted. In the embodiment illustrated in FIG. 5A, a low frequency sinusoidal pulse is detected by passing the augmented audio signal through a bandpass or low-pass filter 502 having a bandpass approximating that of the timing signal's spectral content, and searching the bandfiltered signal for increased energy with a spectral density and duration matching that of the expected timing signals. The bandfiltered signal is then supplied to a rectifier 504 to produce a signal proportional to the absolute value of the bandfiltered signal, and thence to a processor 508. The rectifier 504 may, for example, be a device that determines the peak of the waveform provided by the BPF 502 and holds that value, similar to circuits that are used in power supplies, or may involve digital processing. The processor determines when the timing signal energy is at its peak. In embodiments wherein the timing signal is a sin c(x) pulse, or other pulse having a central energy peak, the synchronization detector 120 provides an event indication when the peak is reached. In embodiments wherein the timing signal is a differential sin c(x) pulse, the processor comprises a peak and zero crossing detector, and the event indication is provided at the time as the bandfiltered signal crosses zero adjacent to the peak energy.

FIG. 5B is a diagram showing another embodiment of the synchronization detector 120. In this embodiment, the detector comprises an optional bandpass or low pass filter 502, communicatively coupled to an optimal filter 508 such as a Kalman filter. The optimal filter 508 is matched to the expected pulses, and is used to identify when the energy in the timing pulse is at its peak. Zero crossing detector 510 determines the zero crossing of the timing signal nearest the point of peak energy. This embodiment of the synchronization detector may also produce a value for the amplitude and type of the audio timing signal 122, as shown. All of the foregoing operations of the sync converter 120 can also be performed by digitally using A/D converter and a digital signal processor as well.

Other timing signal detection techniques can be employed, depending on the timing signal that is used. For example, if the synchronization detector 120 can include a corellator, which attempts to correlate the augmented audio signal with one or more known timing signals on a continuous basis. When the correlator identifies a high degree of correlation between the augmented audio signal and one of the timing signals, the synchronization detector 120 provides the event indication.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, it is noted that the functions depicted and described in the foregoing disclosure can be implemented by one or more hardware modules, one or more software modules defining instructions performed by a processor, or a combination of both as desired.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of inserting synchronization information into a media program having video data describing a video signal and audio data describing an audio signal temporally associated with the video signal, comprising the steps of:
   detecting a video event according to a video event discriminant in the video signal;
   generating a timing signal according to an identified type of the detected video event; and
   inserting the timing signal into the audio signal.

2. The method of claim 1, wherein the video signal comprises a plurality of frames, and the video event discriminant is a change determined by a lack of correlation between a first frame and a second frame of the plurality of frames.

3. The method of claim 1, wherein the audio signal comprises a multiple channel audio signal and wherein the step of inserting the timing signal into the audio signal comprises the step of:
   inserting sub-timing signals into the channels, the phase and amplitude of the sub-timing signals selected such that the combination of the sub-timing signals is zero.

4. The method of claim 1, wherein the audio signal comprises a left audio signal and a right audio signal, and wherein the step of inserting the timing signal into the audio signal comprises the step of:
   inserting a first timing signal in the left audio signal and a second timing signal having the same amplitude and opposite phase than the first timing signal in the right audio signal.

5. The method of claim 1, wherein the timing signal is a sinusoidal pulse.

6. The method of claim 5, wherein the sinusoidal pulse is a differential sinusoidal pulse defined according to $$\frac{\cos(\omega t)}{\omega t} - \frac{\sin(\omega t)}{(\omega t)^2},$$

wherein ω is a fundamental frequency of the pulse.

7. The method of claim 6, wherein the sinusoidal pulse is windowed according to $$\omega(n) = 0.5\left(1 - \cos\left(\frac{2\pi n}{N-1}\right)\right)$$

wherein $0 \leq n \leq N-1$.

8. The method of claim 7, wherein the audio signal has a peak and a zero crossing adjacent thereto, and wherein the pulse is added to the audio signal such that the zero crossing occurs at a defined time offset from the video event.

9. The method of claim 5, wherein a duration of the sinusoidal pulse is between 100 milliseconds and 5 seconds.

10. The method of claim 5, wherein the fundamental frequency of the sinusoidal pulse is between 16 and 24 Hertz.

11. The method of claim 1, wherein the timing signal is a sinusoidal pulse, and the type of video event is determined from a fundamental frequency of the sinusoidal pulse.

12. The method of claim 1, wherein the video event discriminant is one of a group of video event discriminants, and the inserted timing signal is one of a group of timing signals, each timing signal associated with one of the group of video event discriminants.

13. The method of claim 12, wherein the video signal comprises a plurality of video frames, and the group of video event discriminants includes different portions of the video frames.

14. The method of claim 12, wherein the group of timing signals includes sinusoidal pulses of different fundamental frequencies.

15. A method of synchronizing information in a media program having video data describing a video signal and audio data describing an audio signal temporally associated with the video signal, comprising the steps of:
   receiving the video signal and the audio signal, the audio signal having a timing signal indicating a type of video event and a time of the video event detected according to a video event discriminant in the video signal;
   detecting the timing signal in the received audio signal and determining the type of the video event from the detected timing signal;
   detecting the video event in the received video signal; and
   synchronizing the video signal with the audio signal using the detected timing signal and the detected video event.

16. The method of claim 15, wherein the timing signal comprises a left audio signal and a complimentary right audio signal 180 degrees out of phase with the left audio signal.

17. The method of claim 15, wherein the timing signal is a sinusoidal pulse.

18. The method of claim 17, wherein the timing signal is a differential sinusoidal pulse defined according to $$\frac{\cos(\omega t)}{\omega t} - \frac{\sin(\omega t)}{(\omega t)^2},$$

wherein ω is a fundamental frequency of the sinusoidal pulse.

19. The method of claim 18, wherein the sinusoidal pulse is windowed according to $$\omega(n) = 0.5\left(1 - \cos\left(\frac{2\pi n}{N-1}\right)\right)$$

wherein $0 \leq n \leq N-1$.

20. The method of claim 18, wherein the timing signal is a sinusoidal pulse having a peak and a zero crossing adjacent thereto, and wherein the step of synchronizing the video signal with the audio signal using the detected timing signal comprises the steps of:
   finding the zero crossing adjacent the peak of the detected timing signal; and
   presenting the video signal and the audio signal such that the video event is presented at a defined time offset from the zero crossing of the timing signal.

21. The method of claim 20, wherein the step of presenting the video signal and the audio signal such that the video event is presented at a defined time offset from the zero crossing of the audio signal comprises the step of delaying the audio signal and/or the video signal so that the video event is presented at the defined time offset from the zero crossing of the audio signal.

22. The method of claim 15, wherein the video signal comprises a plurality of frames and wherein the video event discriminant is a change in luminance of a portion of a first frame and the portion of a second frame.

23. The method of claim 15, wherein the video signal comprises a plurality of frames, and the video event discriminant is a change determined by a lack of correlation between a first frame and a second frame.

24. The method of claim 15, wherein the video signal comprises a plurality of frames, and the video event discriminant is a temporal change in color between a portion of a first frame and the portion of a second frame.

25. The method of claim 17, wherein a duration of the sinusoidal pulse is between 100 milliseconds and 5 seconds.

26. The method of claim 17, wherein the fundamental frequency of the sinusoidal pulse is between 16 and 24 Hertz.

27. The method of claim 15, wherein the timing signal is a sinusoidal pulse, and the type of video event is determined from a fundamental frequency of the sinusoidal pulse.

28. The method of claim 15, further comprising the steps of:
   generating a second timing signal from the determined type of timing signal; and
   subtracting the second timing signal from the audio signal to remove the timing signal.

29. The method of claim 15, wherein the video event discriminant is one of a group of video event discriminants, and the inserted timing signal is one of a group of timing signals, each timing signal associated with one of the group of video event discriminants.

30. The method of claim 28, wherein the video signal comprises a plurality of frames, and the group of video event discriminants includes different portions of the video frames.

31. The method of claim 28, wherein the group of timing signals includes a sinusoidal pulses of different fundamental frequencies.

32. An apparatus for inserting synchronization information into a media program having video data describing a video signal and audio data describing an audio signal temporally associated with the video signal, comprising:
- a video analysis module for detecting a video event according to an video event discriminant in the video signal;
- a timing signal generator for generating a timing signal according to an identified type of the detected video event; and
- a mixer for inserting the timing signal into the audio signal.

33. The apparatus of claim 32, wherein the video signal comprises a plurality of frames, and the video event discriminant is selected from the group comprising:
- a change in luminance of a portion of a first frame and the portion of a second frame;
- a change determined by determining a lack of correlation between a first frame and a second frame; and
- a temporal change in color between a portion of a first frame and the portion of a second frame.

34. The apparatus of claim 32, wherein the audio signal comprises a left audio signal and a right audio signal, and wherein:
- the timing signal generator generates a left timing signal and a right timing signal having the same amplitude and opposite phase than the left timing signal; and
- the mixer inserts a left timing signal in the left audio signal and a right timing signal in the right audio signal.

35. The apparatus of claim 32, wherein the timing signal comprises a sinusoidal pulse.

36. The apparatus of claim 35, wherein the sinusoidal pulse is defined according to a differential sinusoidal pulse $$\frac{\cos(\omega t)}{\omega t} - \frac{\sin(\omega t)}{(\omega t)^2},$$

wherein $\omega$ is a fundamental frequency of the pulse.

37. The apparatus of claim 35, wherein the sinusoidal pulse is defined according to $$\frac{\cos(\omega t)}{\omega t} - \frac{\sin(\omega t)}{(\omega t)^2},$$

wherein $\omega$ is a fundamental frequency of the pulse and the pulse is windowed according to $$\omega(n) = 0.5\left(1 - \cos\left(\frac{2\pi n}{N-1}\right)\right)$$

wherein $0 \leq n \leq N-1$.

38. The apparatus of claim 35, wherein the audio signal has a peak and a zero crossing adjacent thereto, and wherein the mixer adds the pulse to the audio signal such that the zero crossing occurs at a defined time offset from the video event.

39. The apparatus of claim 35, wherein a duration of the pulse is between 100 milliseconds and 5 seconds.

40. The apparatus of claim 35, wherein the fundamental frequency of the pulse is between 16 and 24 Hertz.

41. The apparatus of claim 32, wherein the video discriminant is one of a group of video discriminants, and the timing signal is one of a group of timing signals, each timing signal associated with one of the group of video discriminants.

42. The apparatus of claim 40, wherein the video signal comprises a plurality of frames, and the group of video discriminants includes different portions of the video frames.

43. The apparatus of claim 40, wherein the group of timing signals includes sinusoidal pulses of different fundamental frequencies.

44. An apparatus for synchronizing information in a media program having video data describing a video signal and audio data describing an audio signal temporally associated with the video signal, comprising the steps of:
- a receiver for receiving the video signal and the audio signal, the audio signal having a timing signal indicating a type of a video event and a time of the video event detected according to a video event discriminant in the video signal;
- a video event detector, for detecting a video event in the received video signal;
- a synchronization detector, for detecting the timing signal and for determining the type of the video event from the detected timing signal; and
- a synchronizer for synchronizing the video signal with the audio signal using the detected timing signal and the detected video event.

45. The apparatus of claim 44, wherein the timing signal is a sinusoidal pulse.

46. The method of claim 45, wherein the timing signal is a differential sinusoidal pulse defined according to $$\frac{\cos(\omega t)}{\omega t} - \frac{\sin(\omega t)}{(\omega t)^2},$$

wherein $\omega$ is a fundamental frequency of the sinusoidal pulse.

47. The method of claim 46, wherein the sinusoidal pulse is windowed according to $$\omega(n) = 0.5\left(1 - \cos\left(\frac{2\pi n}{N-1}\right)\right)$$

wherein $0 \leq n \leq N-1$.

48. The apparatus of claim 44, wherein the timing signal is a sinusoidal pulse having a peak and a zero crossing adjacent thereto, and wherein:
- the synchronization detector comprises a signal analyzer for finding the zero crossing adjacent the peak; and
- the synchronizer comprises delay module for presenting the video signal and the audio signal such that the video event is presented at a defined time offset from the zero crossing of the audio signal.

49. The apparatus of claim 48, wherein the delay module delays the audio signal so that the video event is presented at a defined time offset from the zero crossing of the audio signal.

50. The apparatus of claim 44, wherein the timing signal comprises a left audio signal and a complimentary right audio signal 180 degrees out of phase with the left audio signal.

51. The apparatus of claim 44, wherein the timing signal is a sinusoidal pulse, and the type of video event is determined from a fundamental frequency of the sinusoidal pulse.

52. The apparatus of claim 44, further comprising:
- a timing signal generator, for generating a second timing signal from the determined type of timing signal;
- a subtractor, for removing the second timing signal from the audio signal to remove the timing signal.

53. The apparatus of claim 44, wherein the video signal comprises a plurality of frames and wherein the video event discriminant is a change from a luminance of a first portion of a first frame to a luminance of the first portion of a second frame.

54. The apparatus of claim 44, wherein the video signal comprises a plurality of frames, and the video event discriminant is a change determined by a lack of correlation between a first frame and a second frame.

55. The apparatus of claim 42, wherein the video signal comprises a plurality of frames, and the video event discriminant is a temporal change in color between a portion of a first frame and the portion of a second frame.

56. A method of synchronizing information in a media program having video data describing a video signal and audio data describing an audio signal temporally associated with the video signal, comprising the steps of:
- receiving the video signal and the audio signal, the audio signal having a timing signal indicating a time of a video event;
- detecting the timing signal;
- detecting the video event;
- synchronizing the video signal with the audio signal using the detected timing signal and the detected video event; and
- generating a second timing signal from the detected timing signal; and
- subtracting the second timing signal from the audio signal to remove the timing signal.

* * * * *